(12) United States Patent
Zuo et al.

(10) Patent No.: US 10,024,755 B2
(45) Date of Patent: Jul. 17, 2018

(54) SYSTEMS AND METHODS FOR SAMPLE CHARACTERIZATION

(71) Applicant: Schlumberger Technology Corporation, Sugar Land, TX (US)

(72) Inventors: Youxiang Zuo, Burnaby (CA); Vinay K. Mishra, Katy, TX (US); Hadrien Dumont, Houston, TX (US); Adriaan Gisolf, Houston, TX (US); Christopher Babin, Waveland, MS (US); Cosan Ayan, Istanbul (TR); Beatriz E. Barbosa, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 278 days.

(21) Appl. No.: 14/861,925

(22) Filed: Sep. 22, 2015

(65) Prior Publication Data
US 2016/0091389 A1    Mar. 31, 2016

Related U.S. Application Data

(60) Provisional application No. 62/057,838, filed on Sep. 30, 2014.

(51) Int. Cl.
*G01M 3/32* (2006.01)
*E21B 49/08* (2006.01)
*E21B 49/10* (2006.01)

(52) U.S. Cl.
CPC ......... *G01M 3/3272* (2013.01); *E21B 49/082* (2013.01); *E21B 49/10* (2013.01)

(58) Field of Classification Search
CPC ..... G01M 3/3272; E21B 49/082; E21B 49/10

USPC ................... 73/152.01–152.62, 49.2
See application file for complete search history.

(56) References Cited

U.S. PATENT DOCUMENTS

| 5,247,830 | A  | * | 9/1993 | Goode | ................. E21B 49/008 73/152.51 |
| 7,920,970 | B2 |   | 4/2011 | Zuo et al. | |
| 9,334,724 | B2 | * | 5/2016 | Hsu | ......................... E21B 47/06 |
| 2004/0000400 | A1 | * | 1/2004 | Fujisawa | ............. E21B 47/1015 166/250.01 |

(Continued)

FOREIGN PATENT DOCUMENTS

WO    2015031606 A1    3/2015

OTHER PUBLICATIONS

U.S. Appl. No. 14/263,893, filed Apr. 28, 2014.

(Continued)

*Primary Examiner* — Lisa Caputo
*Assistant Examiner* — Marrit Eyassu
(74) *Attorney, Agent, or Firm* — Michael Dae

(57) ABSTRACT

The present disclosure relates to systems and methods for determining an integrity of a sample chamber. In certain embodiments, formation fluid is collected from a subterranean formation within a sample chamber disposed in a downhole tool, the downhole tool is withdrawn from a wellbore, an estimated surface pressure of the collected formation fluid is determined, the estimated surface pressure of the collected formation fluid is compared with an actual surface pressure of the sample chamber, and the integrity of the sample chamber is determined based on the comparison of the estimated surface pressure and the actual surface pressure.

11 Claims, 10 Drawing Sheets

(56) References Cited

U.S. PATENT DOCUMENTS

| | | | | |
|---|---|---|---|---|
| 2007/0119244 | A1* | 5/2007 | Goodwin | E21B 47/10 73/152.28 |
| 2009/0091320 | A1* | 4/2009 | Flaum | G01V 3/32 324/303 |
| 2009/0200016 | A1* | 8/2009 | Goodwin | E21B 47/10 166/248 |
| 2011/0218736 | A1* | 9/2011 | Pelletier | E21B 49/081 702/12 |
| 2012/0043726 | A1* | 2/2012 | Zubia | E21B 33/085 277/322 |
| 2014/0123747 | A1* | 5/2014 | Veeningen | E21B 47/06 73/152.51 |
| 2015/0233233 | A1* | 8/2015 | Rahman | E21B 47/0005 702/12 |
| 2017/0067322 | A1* | 3/2017 | Wong | E21B 41/00 |

OTHER PUBLICATIONS

McCain Jr., W.D., "The Properties of Petroleum Fluids", 2nd Edition, Pennwell, Tulsa, OK, USA, p. 525, 1990.
Zuo, et al. "Equation-of-State-Based Downhole Fluid Characterization," SPE 114702, SPE Journal, vol. 16, No. 1, pp. 115-124 (2011).

* cited by examiner

SYSTEMS AND METHODS FOR SAMPLE CHARACTERIZATION

CROSS-REFERENCE TO RELATED APPLICATIONS

This application claims benefit of U.S. Provisional Patent Application Ser. No. 62/057,838, entitled "SYSTEM AND METHODS FOR SAMPLE CHARACTERIZATION" filed Sep. 30, 2014, which is herein incorporated by reference.

BACKGROUND OF THE DISCLOSURE

Wellbores or boreholes may be drilled to, for example, locate and produce hydrocarbons. During a drilling operation, it may be desirable to evaluate and/or measure properties of encountered formations and formation fluids. In some cases, a drillstring is removed and a wireline tool deployed into the borehole to test, evaluate and/or sample the formations and/or formation fluid(s). In other cases, the drillstring may be provided with devices to test and/or sample the surrounding formations and/or formation fluid(s) without having to remove the drillstring from the borehole.

Formation evaluation may involve drawing fluid from the formation into a downhole tool for testing and/or sampling. Various devices, such as probes and/or packers, may be extended from the downhole tool to isolate a region of the wellbore wall, and thereby establish fluid communication with the subterranean formation surrounding the wellbore. Fluid may then be drawn into the downhole tool using the probe and/or packer. Within the downhole tool, the fluid may be directed to one or more fluid analyzers and sensors that may be employed to detect properties of the fluid while the downhole tool is stationary within the wellbore.

SUMMARY

The present disclosure relates to a method that includes collecting formation fluid from a subterranean formation within a sample chamber disposed in a downhole tool, withdrawing the downhole tool from a wellbore, determining an estimated surface pressure of the collected formation fluid, comparing the estimated surface pressure of the collected formation fluid with an actual surface pressure of the sample chamber, and determining an integrity of the sample chamber based on the comparison of the estimated surface pressure and the actual surface pressure.

The present disclosure also relates to a method that includes determining an estimated surface pressure of a collected formation fluid stored in a sample chamber, comparing the estimated surface pressure of the collected formation fluid with an actual surface pressure of the sample chamber, and determining an integrity of the sample chamber based on the comparison of the estimated surface pressure and the actual surface pressure.

The present disclosure also relates to a system that includes a downhole tool configured to collect formation fluid from a subterranean formation within a sample chamber disposed in a downhole tool, and a controller comprising machine readable instructions disposed on a memory device. The instructions monitor or control operations of the downhole tool to determine an estimated surface pressure of the collected formation fluid stored in the sample chamber, compare the estimated surface pressure of the collected formation fluid with an actual surface pressure of the sample chamber, and determine an integrity of the sample chamber based on the comparison of the estimated surface pressure and the actual surface pressure.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
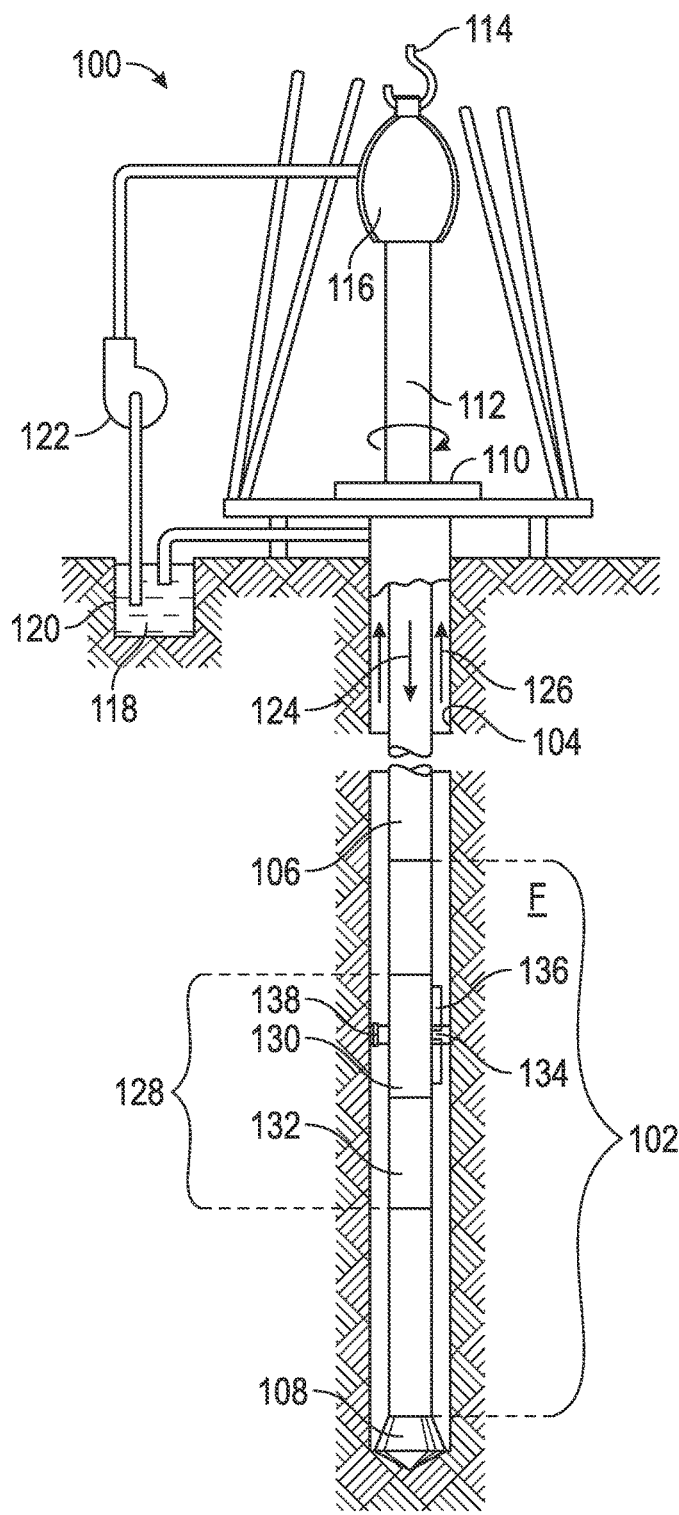
FIG. 1 is a schematic view of an embodiment of a wellsite system that may employ downhole fluid analysis methods, according to aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure relates to systems and methods for characterizing a sample, such as a sample obtained using a downhole tool disposed in a wellbore.

Downhole fluid sampling is important in obtaining representative fluid samples at downhole conditions. In addition, pressure and temperature conditions change from downhole to the surface. Unless sample chambers (e.g., sample bottles) are pressure compensated, sample bottle pressures and temperatures will change with changing environments. Samples received at the surface and/or in the laboratory are often evaluated for their integrity, such as by measuring the opening pressure and comparing the opening pressure with the reported sampling conditions. The pressure of collected samples may be lower at surface conditions. If the opening pressure is less than the saturation pressure of the collected fluid, two gas and liquid phases will coexist. Any leakage from the sampling bottle containing a gas/liquid mixture will change the sample composition. An opening pressure less than the sampling pressure may not necessarily indicate a fluid loss, but may be caused by thermal contraction. Thus, there is a demand for a methodology to estimate the surface pressure of a non-compensated sample bottle, to check whether the sample bottle is leaking, and to determine if the bottle content is in a single phase or multiple phases, based on downhole fluid analysis (DFA) measurements.

In certain embodiments, formation fluid from a subterranean formation may be collected within a sample chamber disposed in the downhole tool. The downhole tool may then be withdrawn from a wellbore. Next, an estimated surface pressure of the collected formation fluid may be determined. The estimated surface pressure of the collected formation fluid may be determined without opening the sample chamber. Next, the estimated surface pressure of the collected formation fluid may be compared with an actual surface pressure of the sample chamber, which may be obtained by opening the sample chamber or otherwise measuring the pressure within the sample chamber. Next, an integrity of the sample chamber may be determined based on the comparison of the estimated surface pressure and the actual surface pressure. For example, if the actual surface pressure of the sample chamber is less than the estimated surface pressure, the integrity of the sample chamber may have been compromised sometime between obtaining the formation fluid and determining the actual surface pressure. Specifically, the sample chamber may have developed a leak, which may potentially cause the accuracy of further measurements or analysis of the formation fluid to be negatively affected. Such inaccuracies may then affect the characterization of the subterranean formation. Thus, the disclosed embodiments may be used to help provide an indication of the suitability of particular samples for further analysis, thereby improving the overall accuracy of the subterranean formation analysis.

Figure 2:
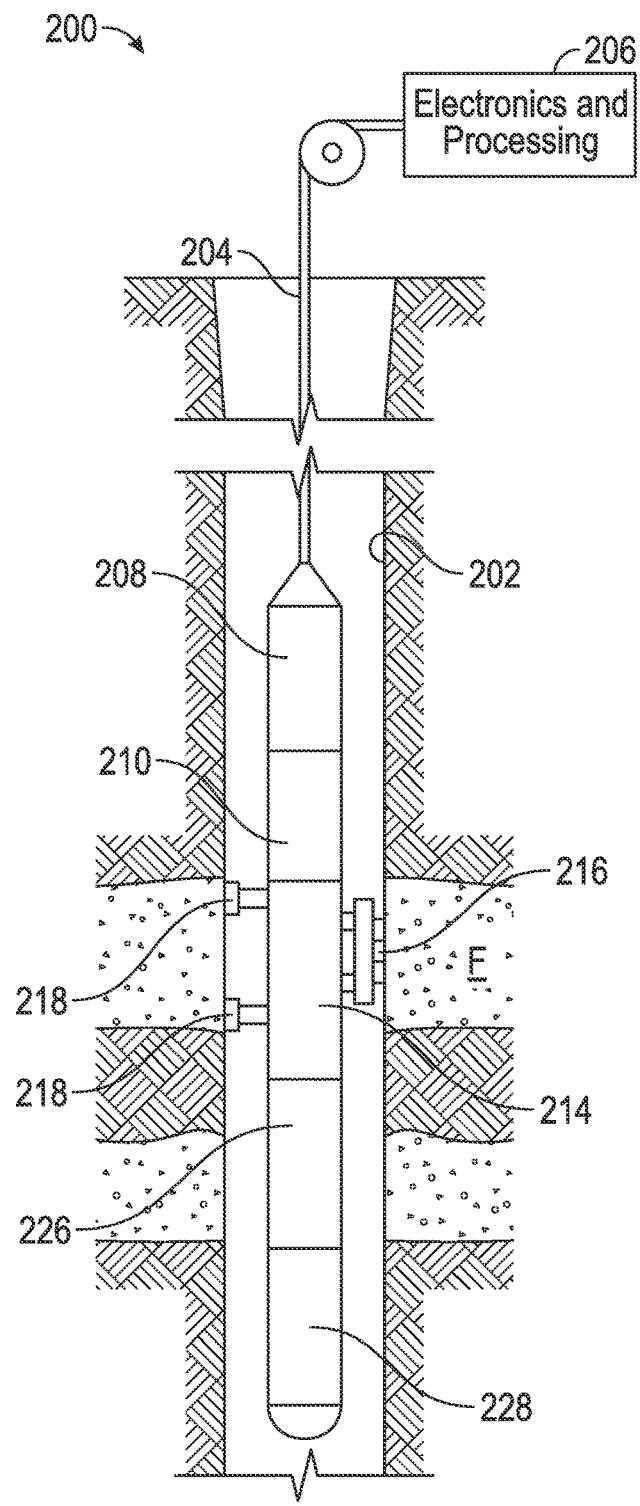
FIG. 2 is a schematic view of another embodiment of a wellsite system that may employ downhole fluid analysis methods, according to aspects of the present disclosure.

FIGS. 1 and 2 depict examples of wellsite systems that may employ the fluid analysis systems and techniques described herein. FIG. 1 depicts a rig 100 with a downhole tool 102 suspended therefrom and into a wellbore 104 via a drill string 106. The downhole tool 100 has a drill bit 108 at its lower end thereof that is used to advance the downhole tool into the formation and form the wellbore. The drillstring 106 is rotated by a rotary table 110, energized by means not shown, which engages a kelly 112 at the upper end of the drillstring 106. The drillstring 106 is suspended from a hook 114, attached to a traveling block (also not shown), through the kelly 112 and a rotary swivel 116 that permits rotation of the drillstring 106 relative to the hook 114. The rig 100 is depicted as a land-based platform and derrick assembly used to form the wellbore 104 by rotary drilling. However, in other embodiments, the rig 100 may be an offshore platform.

Drilling fluid or mud 118 is stored in a pit 120 formed at the well site. A pump 122 delivers the drilling fluid 118 to the interior of the drillstring 106 via a port in the swivel 116, inducing the drilling fluid to flow downwardly through the drillstring 106 as indicated by a directional arrow 124. The drilling fluid exits the drillstring 106 via ports in the drill bit 108, and then circulates upwardly through the region between the outside of the drillstring and the wall of the wellbore, called the annulus, as indicated by directional arrows 126. The drilling fluid lubricates the drill bit 108 and carries formation cuttings up to the surface as it is returned to the pit 120 for recirculation.

The downhole tool 102, sometimes referred to as a bottom hole assembly ("BHA"), may be positioned near the drill bit 108 and includes various components with capabilities, such as measuring, processing, and storing information, as well as communicating with the surface. A telemetry device (not shown) also may be provided for communicating with a surface unit (not shown).

The downhole tool 102 further includes a sampling while drilling ("SWD") system 128 including a fluid communication module 130 and a sampling module 132. The modules may be housed in a drill collar for performing various formation evaluation functions, such as pressure testing and sampling, among others. As shown in FIG. 1, the fluid communication module 130 is positioned adjacent the sampling module 132; however the position of the fluid communication module 130, as well as other modules, may vary in other embodiments. Additional devices, such as pumps, gauges, sensor, monitors or other devices usable in downhole sampling and/or testing also may be provided. The additional devices may be incorporated into modules 130 and 132 or disposed within separate modules included within the SWD system 128.

The fluid communication module 130 includes a probe 134, which may be positioned in a stabilizer blade or rib 136. The probe 134 includes one or more inlets for receiving formation fluid and one or more flowlines (not shown) extending into the downhole tool for passing fluids through the tool. In certain embodiments, the probe 134 may include a single inlet designed to direct formation fluid into a flowline within the downhole tool. Further, in other embodiments, the probe may include multiple inlets that may, for example, be used for focused sampling. In these embodiments, the probe may be connected to a sampling flow line, as well as to guard flow lines. The probe 134 may be movable between extended and retracted positions for selectively engaging a wall of the wellbore 104 and acquiring fluid samples from the formation F. One or more setting pistons 138 may be provided to assist in positioning the fluid communication device against the wellbore wall.

FIG. 2 depicts an example of a wireline downhole tool 200 that may employ the systems and techniques described herein. The downhole tool 200 is suspended in a wellbore 202 from the lower end of a multi-conductor cable 204 that is spooled on a winch (not shown) at the surface. The cable 204 is communicatively coupled to an electronics and processing system 206. The downhole tool 200 includes an elongated body 208 that includes a fluid communication module 214 that has a selectively extendable probe 216 and backup pistons 218 that are arranged on opposite sides of the elongated body 208. The extendable probe 216 is configured to selectively seal off or isolate selected portions of the wall of the wellbore 202 to fluidly couple to the adjacent formation F and/or to draw fluid samples from the formation F. The probe 216 may include a single inlet or multiple inlets designed for guarded or focused sampling. Additional modules (e.g., 210) that provide additional functionality such as fluid analysis, resistivity measurements, coring, or imaging, among others, also may also be included in the tool 200.

The formation fluid may be expelled through a port (not shown) or it may be sent to one or more fluid sampling modules 226 and 228. In the illustrated example, the electronics and processing system 206 and/or a downhole control system are configured to control the extendable probe assembly 216 and/or the drawing of a fluid sample from the formation F.

Figure 3:
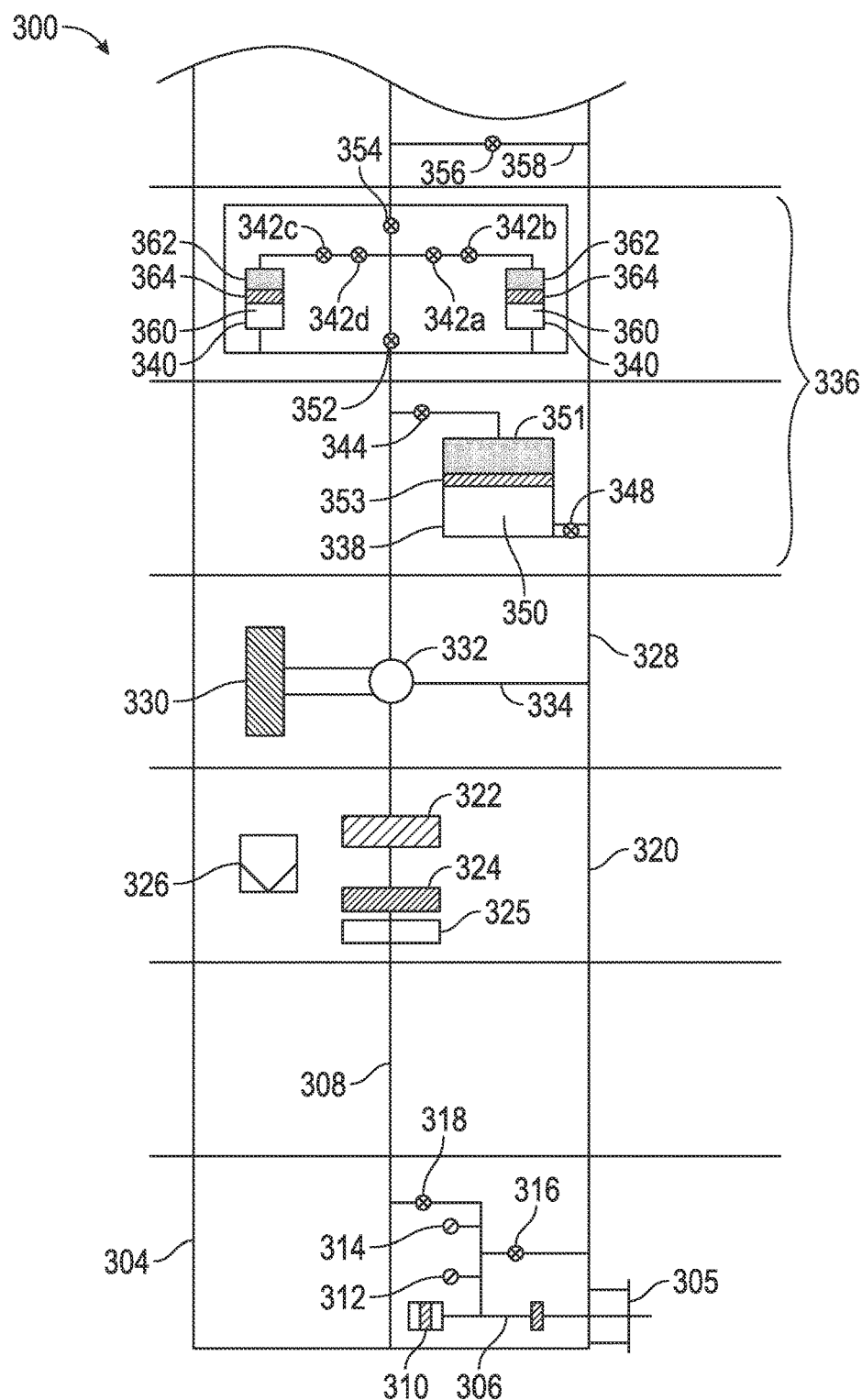
FIG. 3 is a schematic representation of an embodiment of a downhole tool that may employ downhole fluid analysis methods, according to aspects of the present disclosure.

FIG. 3 is a schematic diagram of a portion of downhole tool 300 that may employ the fluid analysis methods described herein. For example, the downhole tool 300 may be a drilling tool, such as the downhole tool 102 described above with respect to FIG. 1. Further, the downhole tool 300 may be a wireline tool, such as the downhole tool 200 described above with respect to FIG. 2. Further, in other embodiments, the downhole tool may be conveyed on wired drill pipe, a combination of wired drill pipe and wireline, or other suitable types of conveyance.

As shown in FIG. 3, the downhole tool 300 includes a fluid communication module 304 that has a probe 305 for directing formation fluid into the downhole tool 300. According to certain embodiments, the fluid communication module 304 may be similar to the fluid communication modules 130 and 214, described above with respect to FIGS. 1 and 2, respectively. The fluid communication module 304 includes a probe flowline 306 that directs the fluid to a primary flowline 308 that extends through the downhole tool 300. In certain embodiments, the flowline 308 may include dual flowlines, such as a sample line and a guard line for focused sampling tools. The fluid communication module 304 also includes a pump 310 and pressure gauges 312 and 314 that may be employed to conduct formation pressure tests. An equalization valve 316 may be opened to expose the flowline 306 to the pressure in the wellbore, which in turn may equalize the pressure within the downhole tool 300. Further, an isolation valve 318 may be closed to isolate the formation fluid within the flowline 306, and may be opened to direct the formation fluid from the probe flowline 306 to the primary flowline 308. a1

The primary flowline 308 directs the formation fluid through the downhole tool to a fluid analysis module 320 that can be employed to provide in situ downhole fluid measurements. For example, the fluid analysis module 320 may include an optical spectrometer 322 and a gas analyzer 324 designed to measure properties such as, optical density, fluid density, fluid viscosity, fluid fluorescence, fluid composition, and the fluid gas oil ratio (GOR), among others. According to certain embodiments, the spectrometer 322 may include any suitable number of measurement channels for detecting different wavelengths, and may include a filter-array spectrometer or a grating spectrometer. For example, the spectrometer 322 may be a filter-array absorption spectrometer having ten measurement channels. In other embodiments, the spectrometer 322 may have sixteen channels or twenty channels, and may be provided as a filter-array spectrometer or a grating spectrometer, or a combination thereof (e.g., a dual spectrometer), by way of example. According to certain embodiments, the gas analyzer 324 may include one or more photodetector arrays that detect reflected light rays at certain angles of incidence. The gas analyzer 324 also may include a light source, such as a light emitting diode, a prism, such as a sapphire prism, and a polarizer, among other components. In certain embodiments, the gas analyzer 324 may include a gas detector and one or more fluorescence detectors designed to detect free gas bubbles and retrograde condensate liquid drop out.

One or more additional measurement devices 325, such as temperature sensors, pressure sensors, resistivity sensors, density sensors, viscosity sensors, chemical sensors (e.g., for measuring pH or $H_2S$ levels), saturation point (bubble/dew point) sensors, asphaltene onset point sensors, and gas chromatographs, may be included within the fluid analysis module 320. In certain embodiments, the fluid analysis module may include a controller 326, such as a microprocessor or control circuitry, designed to calculate certain fluid properties based on the sensor measurements. Further, in certain embodiments, the controller 326 may govern sampling operations based on the fluid measurements or properties. Moreover, in other embodiments, the controller 326 may be disposed within another module of the downhole tool 300.

The downhole tool 300 also includes a pump out module 328 that has a pump 330 designed to provide motive force to direct the fluid through the downhole tool 300. According to certain embodiments, the pump 330 may be a hydraulic displacement unit that receives fluid into alternating pump chambers. A valve block 332 may direct the fluid into and out of the alternating pump chambers. The valve block 332 also may direct the fluid exiting the pump 330 through the remainder of the primary flowline (e.g., towards the sample module 336) or may divert the fluid to the wellbore through a dump flowline 334.

The downhole tool 300 also includes one or more sample modules 336 designed to store samples of the formation fluid within sample chambers 338 and 340. Although one sample chamber 338 and two sample chambers 340 are shown in FIG. 3, other embodiments may include different numbers of sample chambers, such as 1, 2, 3, 4, 5, 6, or more sample chambers. The estimated surface pressure of one or more samples chambers 338 and 340 may be determined using one or more of the disclosed techniques described in detail below. In the disclosed techniques, the estimated surface pressure may be determined. In addition, a thermal expansion coefficient of the formation fluid may also be determined. According to certain embodiments, the estimated surface pressure of the one or more sample chambers 338 and 340 may be compared with corresponding actual surface pressures of the one or more sample chambers 338 and 340 to determine integrities of the one or more sample chambers 338 and 340. For example, if the actual surface pressure is less than the estimated surface pressure, the sample chamber 338 or 340 may have developed a leak. As shown in FIG. 3, the sample module 336 includes valves 342A, 342B, 342C, and 342D that may be actuated to divert the formation fluid into the sample chambers 340. The sample module 336 also includes a valve 344 that may be actuated to divert the formation fluid into the sample chamber 338. The sample chamber 338 also may include a valve 348 that can be opened to expose a volume 350 of the sample chamber 338 to the annular pressure. In certain embodiments, the valve 348 may be opened to allow buffer fluid to exit the volume 350 to the wellbore, which may provide backpressure during filling of the volume 351. According to certain embodiments, the volume 351, which may store formation fluid, may be separated from the volume 350 by a floating piston 353.

The sample module 336 also includes valves 352 and 354 that can be opened to allow formation fluid through the primary flowline in the sample module 336 or closed to isolate the sample module 336 from the remainder of the primary flowline 308. The sample module 336 further includes a valve 356 that can be opened to allow fluid to exit the sample module 336 and flow into the wellbore through a flowline 358. For example, the valve 356 may be opened to allow buffer fluid from volumes 360 within the sample chambers 340 to exit the sample module 336, which in turn may provide back pressure during filling of the volumes 362 within the sample chambers 340. In this embodiment, the valve 354 may be closed so that the buffer fluid flows through the flowline 358 and the valve 356 to the wellbore, which may provide back pressure during filling of the volumes 362 with formation fluid. According to certain embodiments, the volumes 360 may be separated by the volumes 362 by floating pistons 364.

The valve arrangements described herein are provided by way of example, and are not intended to be limiting. For example, the valves described herein may include valves of various types and configurations, such as ball valves, gate valves, solenoid valves, check valves, seal valves, two-way valves, three-way valves, four-way valves, and combinations thereof, among others. Further, in other embodiments, different arrangements of valves may be employed. For example, the valves 342A and 342B may be replaced by a single valve, and the valves 342C and 342D may be replaced by a single valve. In another example, the valves 354 and 356 may be replaced by a three-way valve designed to divert flow through the downhole tool and to the wellbore. In addition, the arrangement of modules of the downhole tool 300 described herein are provided by way of example, and are not intended to be limiting. For example, in certain embodiments, fluid analysis module 320 may be disposed between the pump out module 328 and the sample module 336, rather than between the pump out module 328 and the probe module 304.

Figure 4:
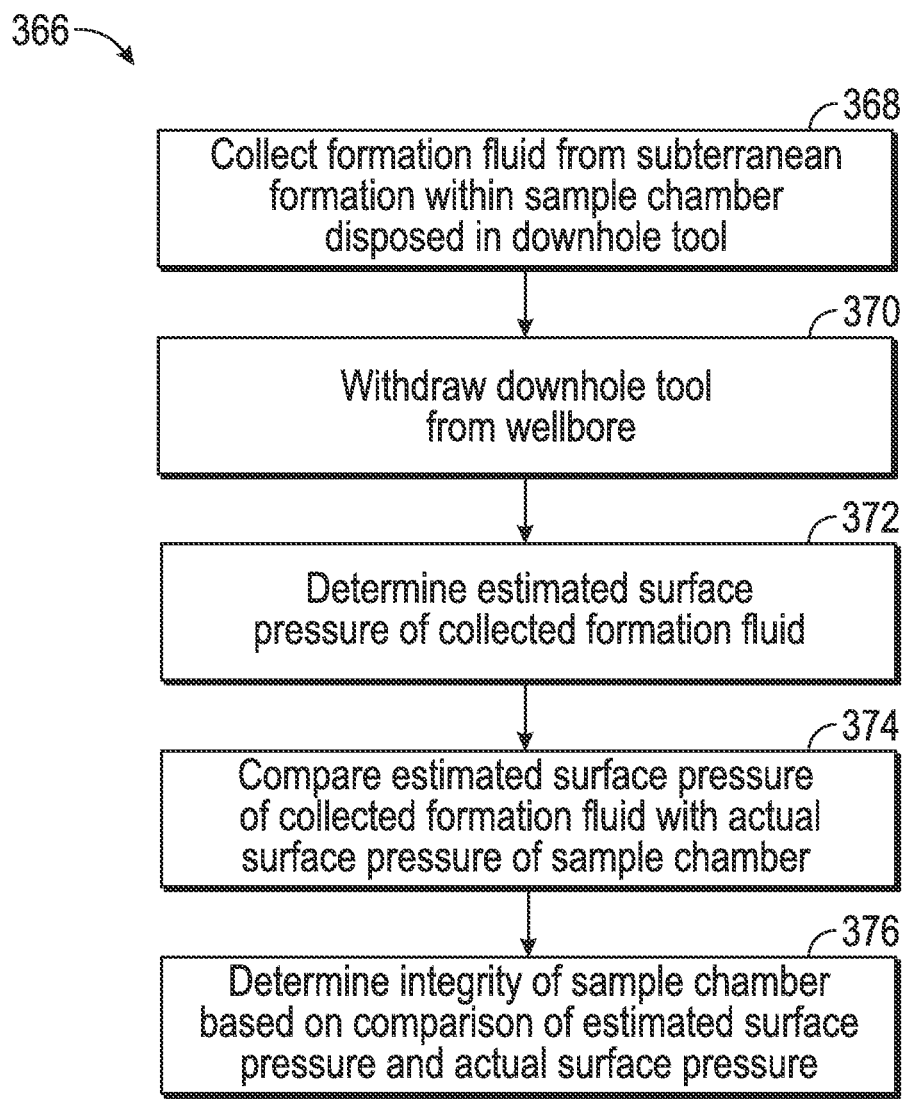
FIG. 4 is a flowchart depicting a method for determining an integrity of a sample chamber using an estimated surface pressure of the sample chamber, according to aspects of the present disclosure.

FIG. 4 depicts a method 366 for determining an integrity of a sample chamber, such as one or more of the sample chambers 338 and 340 described above, using an estimated surface pressure of the sample chamber. The method 366 may begin by collecting (block 368) the formation fluid from the formation F (e.g., subterranean formation) with one or more sample chambers 338 and 340 disposed in the downhole tool, such as the downhole tools 102, 200, and 300 described above. The downhole tool may then be withdrawn (block 370) from the wellbore, such as wellbores 104 and 202 described above. Next, the estimated surface pressure of the collected formation fluid may be determined (block 372), as described in detail below. The determination of the estimated surface pressure may be performed by the electronics and processing system 206, a downhole control system, the controller 326, or any other control system disposed within the downhole tool or at the surface. For example, the controller 326 may execute code stored within circuitry of the controller 326, or within a separate memory or other tangible readable medium, to perform the method 366. In certain embodiments, portions of the method 366 may be wholly executed while the downhole tool is disposed within a wellbore. Further, in certain embodiments, the controller 326 may operate in conjunction with a surface controller that may perform one or more operations of the method 366.

Next, the estimated surface pressure determined in block 372 may be compared (block 374) with the actual surface pressure of the sample chamber. For example, the actual surface pressure of the sample chamber may be determined by measuring the pressure of the collected formation fluid using a pressure sensor, gage, or similar device while the sample chamber is at the surface. The comparison of the estimated and actual surface pressures may be performed by the electronics and processing system 206, the downhole control system, the controller 326, or any other control system disposed within the downhole tool or at the surface. Next, the integrity of the sample chamber may be determined (block 376) based on the comparison of the estimated surface pressure and actual surface pressure performed in block 374. For example, if the actual surface pressure of the sample chamber is less than the estimated surface pressure by some predetermined threshold, the integrity of the sample chamber may have been compromised at some time between collection of the formation fluid and the measurement of the actual sample pressure. Specifically, the sample chamber may have developed a leak, which may negatively affect the accuracy of any further analysis of the formation fluid contained within the compromised sample chamber. The threshold may be based on an absolute or percentage difference between the estimated and actual surface pressures. For example, if the absolute difference between the estimated and actual surface pressures is greater than approximately 100 psia or the percentage difference is greater than approximately 15%, then the integrity of the sample chamber may have been compromised. In certain embodiments, other values or techniques may be used to determine if the estimated and actual surface pressures are close enough to one another to indicate the integrity of the sample chamber. Again, the determination of the integrity of the sample chamber may be performed by the electronics and processing system 206, the downhole control system, the controller 326, or any other control system disposed within the downhole tool or at the surface.

Figure 5:
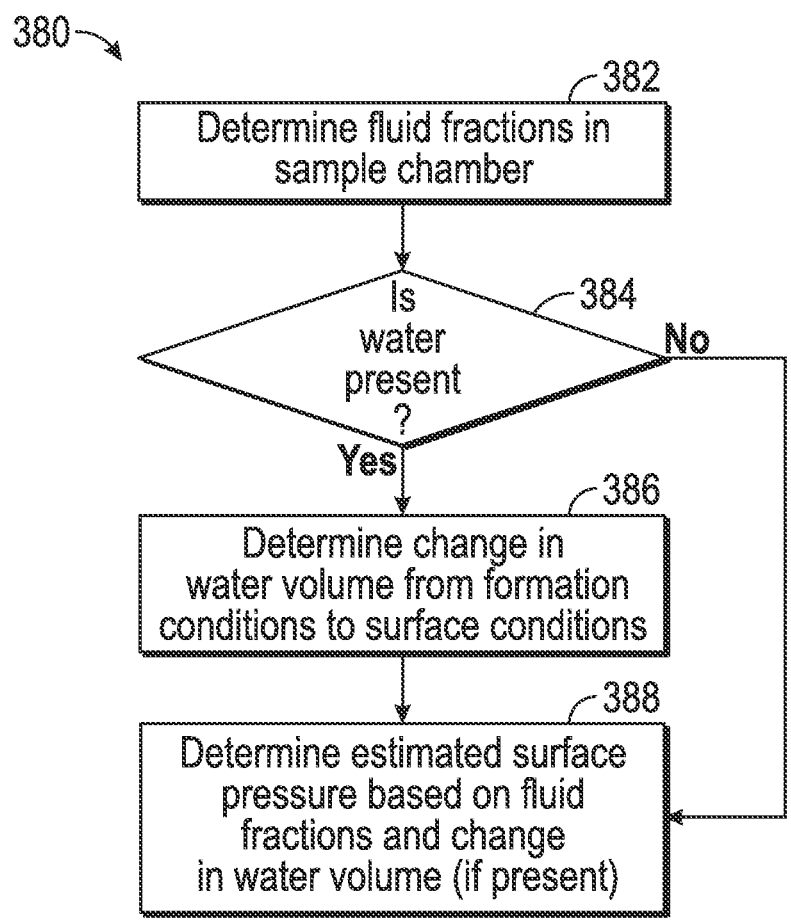
FIG. 5 is a flowchart depicting a method for determining an estimated surface pressure of a sample chamber, according to aspects of the present disclosure.

FIG. 5 depicts a method 380 for determining an estimated surface pressure of the sample chamber. The method may begin by determining the fluid fractions in the bottle (block 382). If water is present (block 384), the method may determine (block 386) the change in water volume from downhole to surface conditions. Because water is less compressible than hydrocarbons, the presence of water will drive the water-hydrocarbons fluid fractions. Next, the hydrocarbon pressure change is determined (block 388).

According to one or more embodiments, DFA measures the compositions of $CO_2$, C1, C2, C3-C5 (or individual C3, C4 and C5), C6+, oil/gas ratio (GOR), density, viscosity, oil-base mud (OBM) level, saturation point pressure, water volume fraction, asphaltene onset pressure, resistivity, asphaltene content (fluid color), and so on during cleanup processes downhole in real time. After the reservoir fluid reaches the sampling requirements, the fluid is charged to sample bottles (chambers), as described above, and the content of the bottle is quantified with the mentioned DFA measurements. DFA also measures the temperature and pressure for the sample bottle filled with the reservoir fluid. The saturation pressure and asphaltene onset pressure (AOP) are also measured to determine whether the fluid in the sample bottle is in a single phase or multiple phases (gas, oil and/or water). If the sample pressure is below the saturation pressure or asphaltene onset pressure, the sample may not be representative. Therefore, that sample may not be monitored.

Figure 6:
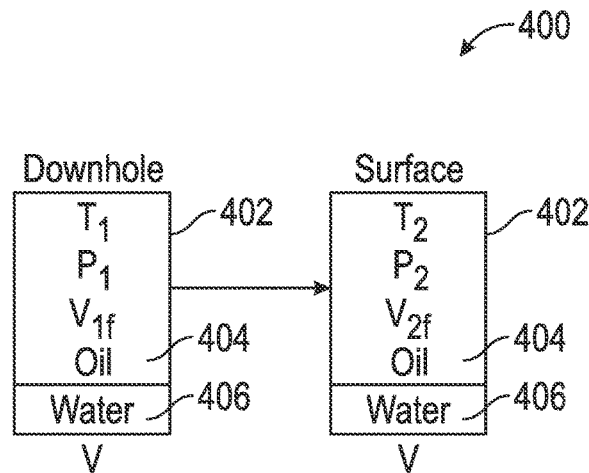
FIG. 6 is a schematic representation of a sample chamber at downhole conditions and surface conditions, according to aspects of the present disclosure.

In determining the estimated surface pressure according to the disclosed embodiments, it is assumed that the total volume of the non-compensated sample bottle is unchanged from downhole to surface conditions. FIG. 6 shows a schematic diagram 400 of the non-compensated sample bottle 402 from downhole to surface conditions. Specifically, the hydrocarbon (e.g., oil) 404 may be present at a downhole temperature $T_1$, a downhole pressure $P_1$, and downhole volume $V_{1f}$ and water 406 may also be present at downhole conditions. In addition, the hydrocarbon (e.g., oil) 404 may be present at a surface temperature $T_2$, a surface pressure $P_2$, and surface volume $V_{2f}$ and water 406 may also be present at surface conditions. In determining the estimated surface pressure according to the disclosed embodiments, it is also assumed that the reservoir hydrocarbon fluid is in a single phase (gas or oil) at downhole conditions. DFA measured water fraction is represented by $f_w$. Then, the oil (or gas) fraction is $1-f_w$.

The water formation volume factor (volume of water at specified conditions divided by volume of water at standard conditions) may be calculated by McCain's correlation $$B_w = (1+\Delta V_T)(1+\Delta V_P) \tag{1}$$

where $B_w$ is the formation volume factor of water at specified temperature and pressure. $\Delta V_T$ and $\Delta V_P$ may be estimated by the following equations:

$$\Delta V_T = -1.0001 \times 10^{-2} + 1.33391 \times 10^{-4} T + 5.50654 \times 10^{-7} T^2 \tag{2}$$

$$\Delta V_P = -1.95301 \times 10^{-9} PT - 1.72834 \times 10^{-13} P^2 T - 3.58922 \times 10^{-7} P - 2.25341 \times 10^{-10} P^2 \tag{3}$$

where T and P are the temperature in degrees Fahrenheit and pressure in psia, respectively. It is assumed that the total volume of the sample bottle is V. The volumes of water and reservoir fluid at downhole conditions ($P_1$, $T_1$) are given by the following equations:

$$V_{1w} = f_w V \quad V_{1f} = (1-f_w) V \tag{4}$$

where the subscripts w and f denote water and the reservoir hydrocarbon fluid. The volume of water and reservoir hydrocarbon fluid at surface conditions ($P_2$, $T_2$) are given by the following equations:

$$V_{2w} = \frac{(B_w)_{T_2,P_2}}{(B_w)_{T_1,P_1}} f_w V \tag{5}$$

$$V_{2f} = \left(1 - \frac{(B_w)_{T_2,P_2}}{(B_w)_{T_1,P_1}} f_w\right) V$$

where $B_w$ is calculated by Equation (1). Therefore, the volume compensated by water in the sample bottle can be determined. The surface conditions ($P_2$, $T_2$) can be measured on surface or in a laboratory.

According to thermodynamics, for the reservoir hydrocarbon fluid, we have the following equations:

$$\left(\frac{\partial P}{\partial T}\right)_V \left(\frac{\partial T}{\partial V}\right)_P \left(\frac{\partial V}{\partial P}\right)_T = -1 \tag{6}$$

$$\left(\frac{\partial P}{\partial T}\right)_V = \left[\frac{1}{V}\left(\frac{\partial V}{\partial T}\right)_P\right] / \left[-\frac{1}{V}\left(\frac{\partial V}{\partial P}\right)_T\right] = \frac{\alpha}{\beta} \tag{7}$$

where $\alpha$ is the thermal expansion coefficient and $\beta$ is the isothermal compressibility coefficient. The average values can be used in the disclosed embodiments if it is assumed that the volume of the reservoir fluid in the sample bottle is unchanged, i.e., ignoring water volume compensation. Therefore, Equation (7) may be integrated from downhole to surface conditions, as represented by the following equation:

$$\int_{P_1}^{P_2} \beta dP = \int_{T_1}^{T_2} \alpha dT \tag{8}$$

The surface bottle pressure may then be determined by using Equation (8) as $P_1$, $T_1$, and $T_2$ are known. $\beta$ may be computed by the measured density versus pressure as disclosed in U.S. application Ser. No. 14/263,893, entitled "Determining Formation Fluid Variation With Pressure," filed Apr. 28, 2014, which is hereby incorporated herein by reference in its entirety. In addition, $\alpha$ and $\beta$ may be estimated by the correlations or equation for similar reservoir fluids. Using the disclosed techniques, the sample bottle pressure at surface conditions may be determined and compared with the measured opening pressure of the sample bottle. If the estimated surface pressure and the actual surface pressure (e.g., opening pressure) are close enough (e.g., within a range of pressures, or the absolute or percentage differences are less than a threshold), then it is likely that no fluid leakage has occurred with the particular sample bottle. Otherwise, if the absolute or percentage differences between the estimated surface pressure and the actual surface pressure are greater than a threshold, then bottle leakage is suspected.

Figure 7:
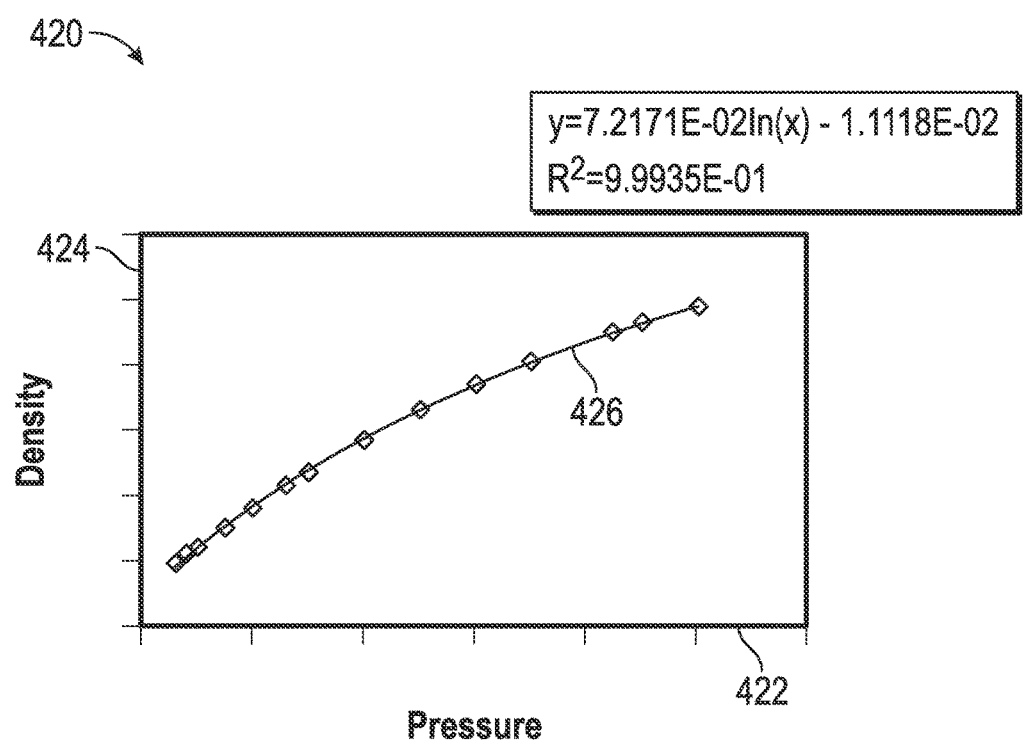
FIG. 7 is a plot depicting an embodiment of fluid analysis measurements obtained according to aspects of the present disclosure.

In addition, if it is known that there is no leaking of the sample chamber, and $T_2$ and $P_2$ are measured at surface, the thermal expansion coefficient ($\alpha$) can be determined. In one example, an oil may have a GOR of approximately 1500 scf/bbl and an API gravity of approximately 36. The density change with pressure of the oil 420 is measured downhole as represented in FIG. 7. As shown in FIG. 7, pressure 422 is shown on the x-axis, density 424 is shown on the y-axis, and the relationship is shown by line 426. An equation representing the line 426 is also shown in FIG. 7. The compressibility can be estimated by using the following equation:

$$\alpha = \frac{1}{\rho}\frac{d\rho}{dP} \tag{9}$$

Figure 8:
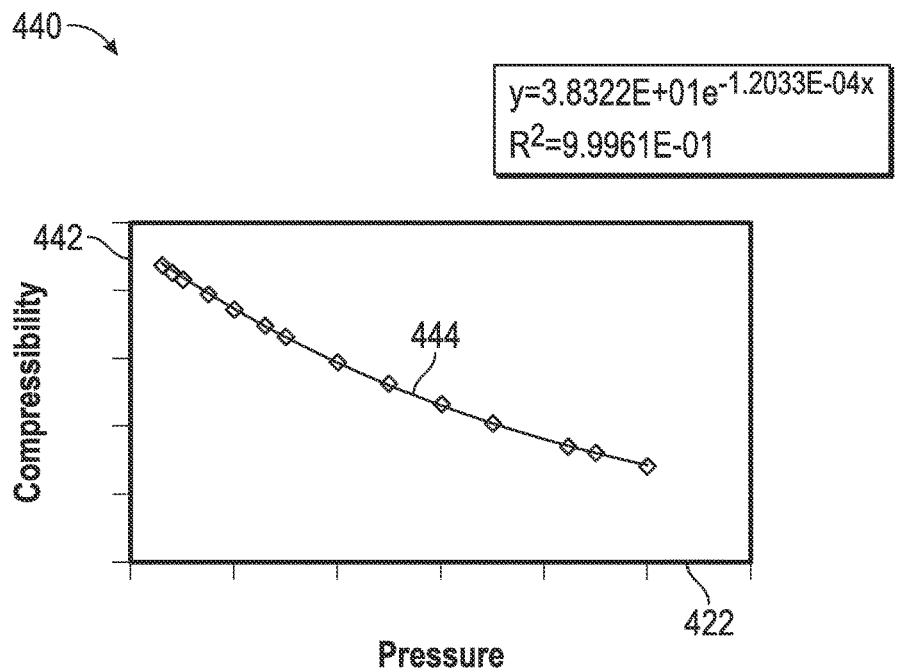
FIG. 8 is a plot depicting another embodiment of fluid analysis measurements obtained according to aspects of the present disclosure.

Using Equation 9, the relationship between pressure and compressibility is represented in FIG. 8. As shown in FIG. 8, pressure 422 is shown on the x-axis, compressibility 442 is shown on the y-axis, and the relationship is shown by line 444. An equation representing the line 444 is also shown in FIG. 8. It is assumed that thermal expansion coefficient is independent of temperature, which is often a weak function of temperature, or an average value). Then, the thermal expansion coefficient may be calculated using the following equation for this example:

$$\alpha = \frac{\int_{P_1}^{P_2} \beta dP}{(T_2 - T_1)} = \frac{\int_{P_1}^{P_2} 38.32 \times 10^{-6} e^{-1.2033 \times 10^{-4} P} dP}{(T_2 - T_1)} = \frac{-0.31845\left(e^{-1.2033 \times 10^{-4} P_2} - e^{-1.2033 \times 10^{-4} P_1}\right)}{(T_2 - T_1)} \tag{10}$$

For this example, the downhole conditions are approximately 12,500 psia and approximately 252 F and the surface conditions are approximately 6,400 psia and approximately 75 F. Using Equation (10), the thermal expansion coefficient is determined to be 0.00043 1/F (0.00078 1/K), which is close to the value for paraffin oil (0.000764 1/K). On the other hand, if $\alpha$ is assumed to be approximately 0.000764 (corresponding to paraffin oil), bottle pressure at a specific temperature may be obtained using the following equation:

$$e^{-1.2033 \times 10^{-4} P_2} = \left( e^{-1.2033 \times 10^{-4} P_1} + \frac{\alpha(T_2 - T_1)}{-0.31845} \right) \quad (11)$$

For this example, using the value of $T_2=75$ F, $P_2$ is determined to be approximately 6,486 psia, which is close to the measured value of 6,400 psia. For this example, the measured pressure of the sample bottle is approximately 1,600 psia at 75 F, thus indicating that the bottle leaked during transportation, and the sample is not representative.

Figure 9:
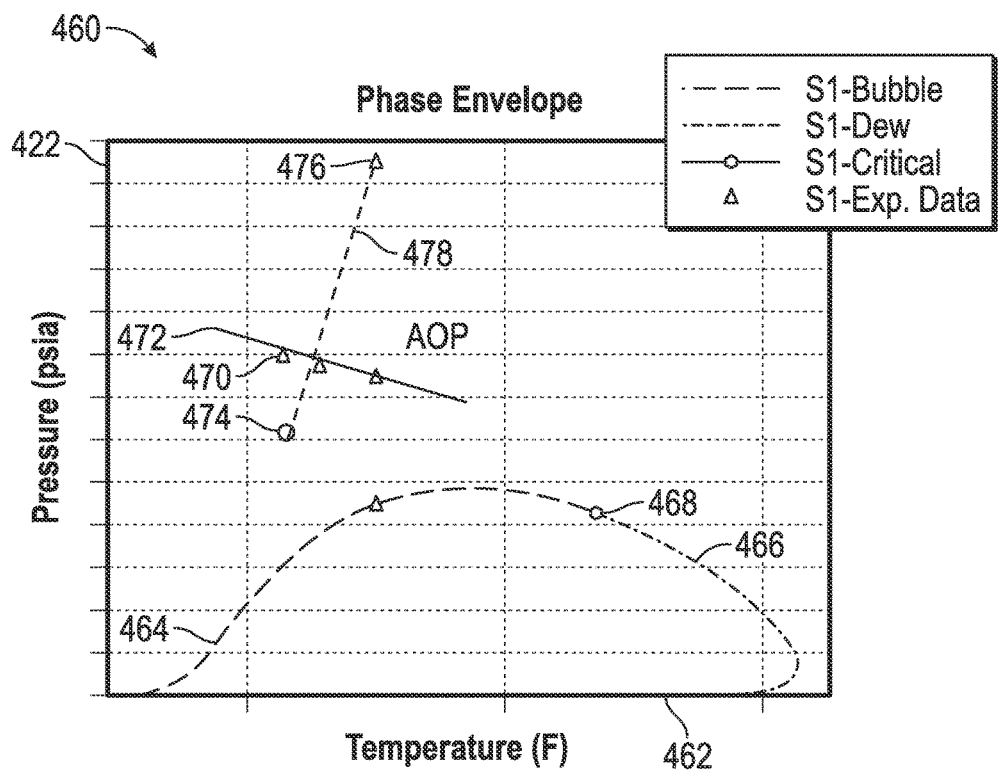
FIG. 9 is a plot also depicting another embodiment of fluid analysis measurements obtained according to aspects of the present disclosure.

In another example, the temperature of sample bottles can reach approximately 55 F during removal from an offshore wellbore and the sample bottle pressure may decrease to approximately 6,016 psia. The phase envelope 460 of the fluid for this example is depicted in FIG. 9. As shown in FIG. 9, temperature 462 is shown on the x-axis, pressure 422 is shown on the y-axis, a bubble portion 464 of the phase envelope is shown on the left, a dew portion 466 of the phase envelope is shown on the right, the bubble and dew portions 464 and 466 are separated at point 468, experimental data is represented by points 470, the AOP is labeled 472, the surface conditions are represented by point 474, the reservoir conditions represented by point 476, and the transition from reservoir to surface conditions represented by line 478. As shown in FIG. 9, although the fluid is in a single oil phase at downhole conditions (point 476), asphaltenes drop out as the sample bottle is removed from the well because the sample bottle pressure is below the asphaltene onset pressure (AOP) because of the decrease in temperature. Because asphaltene flocculation may not be 100% reversible, the sample may not be representative. As such, the disclosed techniques may not only be used to determine if the integrity of a sample chamber has been compromised, but also to determine if a sample may be representative or not because of falling below the AOP.

Figure 10:
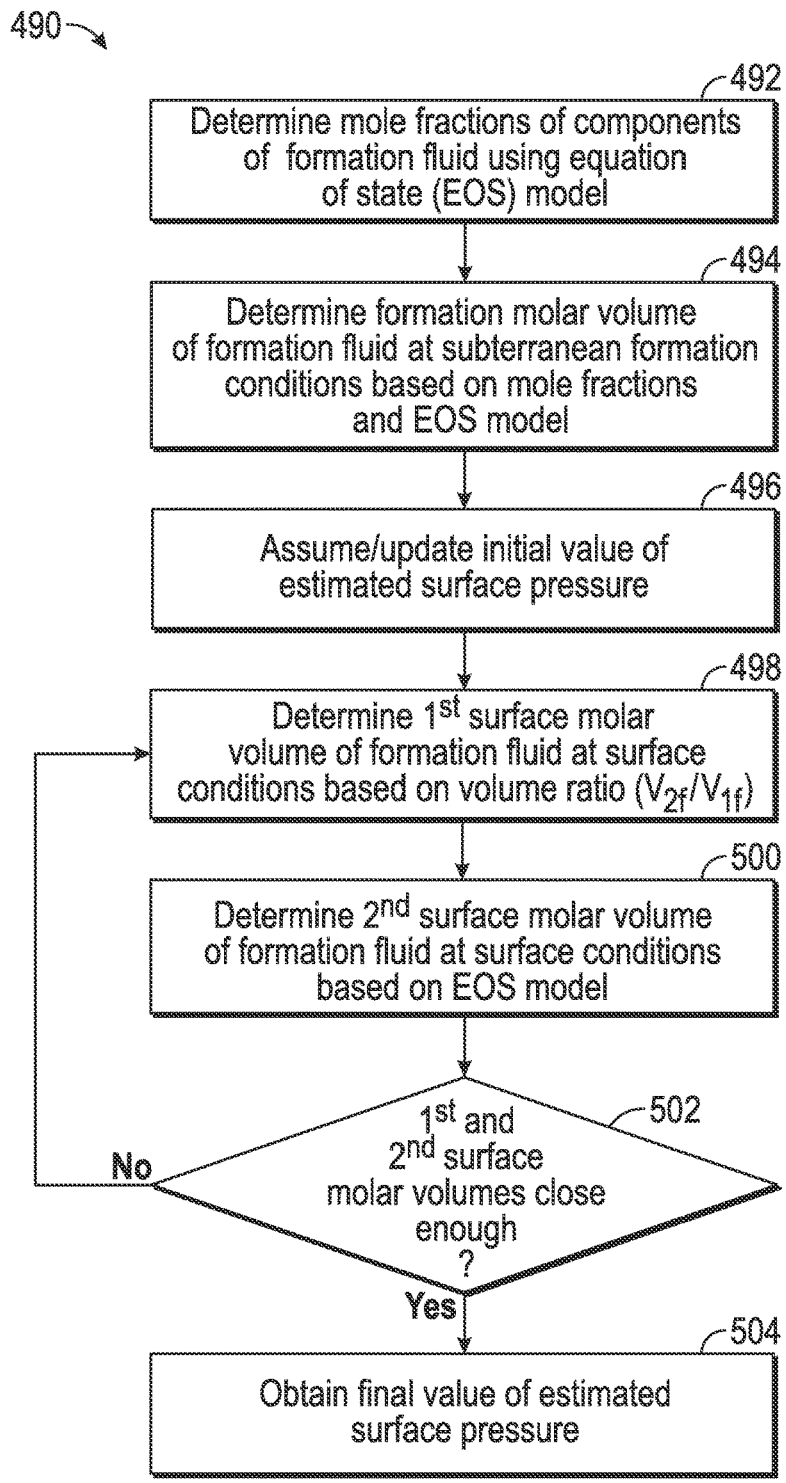
FIG. 10 is a flowchart depicting a method for determining an estimated surface pressure of a sample chamber using an equation of state (EOS) model, according to aspects of the present disclosure.

FIG. 10 depicts a method 490 for determining an estimated surface pressure of the sample chamber that uses equations of state (EOS), which are used to model pressure-volume-temperature (PVT) properties of reservoir fluids in the industry. Therefore, the method 490 is based on DFA measurements downhole. For example, DFA may measure composition (wt %) of $CO_2$, C1, C2, C3-C5, C6+, GOR, density, viscosity, saturation point, and so forth of the formation fluid captured in the bottle, as well as the pressure and temperature. Downhole gas chromatography (GC) may measure $CO_2$, C1, C2, C3, C4, C5, C6, C7, . . . C29 and C30+. These data as well as the downhole sample temperature and pressure ($P_1$, $T_1$) are used as inputs for the method 490.

To begin the method 490, the mole fractions of the components of the formation fluid may be determined (block 492) using an EOS model. For example, the delumping and characterization method described in U.S. Pat. No. 7,920,970, entitled "Methods and apparatus for characterization of petroleum fluid and applications thereof," filed Sep. 11, 2008, which is hereby incorporated herein by reference in its entirety, may be employed to convert the compositions in wt % to mole fractions ($z_i$) for all the components including pseudo-components. The EOS uses component properties, such as critical temperature, critical pressure, acentric factor, volume shift parameter, molecular weight, specific gravity, and boiling point temperature to generate binary interaction parameters. The EOS model is then established by tuning the EOS parameters to match DFA-measured GOR, density, and saturation pressure data. As a result of the tuning process, a more accurate EOS model is obtained.

Next, the formation molar volume of the formation fluid is determined (block 494) based on the mole fractions from block 492 and the EOS model. Specifically, one mole of reservoir fluid is assumed to begin the calculations. In addition, the variation of hydrocarbon solubility in water is ignored because of the higher pressure, lower temperature, and higher hydrocarbon solubility in water. Next, the molar volume ($v_1$) of the reservoir fluid at the specified downhole sampling temperature and pressure ($P_1$, $T_1$) is determined using the tuned EOS model from block 492.

Next, an initial surface pressure ($P_2$) at a specified surface temperature ($T_2$) is assumed (block 496). According to the DFA-measured water volume fraction in the sample bottle, the volume ratio ($V_2/V_{1f}$) for the reservoir fluids at downhole and surface conditions is determined using Equations (4) and (5), as discussed above, to correct for the presence of water. Next, a first surface molar volume of formation fluid ($v_2'$) at surface conditions is determined (block 498) based on the volume ratio ($V_2/V_{1f}$) using the following equation:

$$v_2' = v_1 V_2/V_{1f} \quad (12)$$

Next, a molar volume ($v_2$) at the surface temperature and pressure ($P_2$, $T_2$) is determined (block 500) using the EOS model from block 492. Next, $v_2$ and $v_2'$ are compared (block 502) to determine if they are close enough. For example, if the absolute value of the difference between $v_2$ and $v_2'$ is greater than a threshold value (e.g., if $|v_2-v_2'|>10-12$), then the value of $P_2$ is updated (block 496), and the method returns to block 498. Otherwise, if the values of $v_2$ and $v_2'$ are close enough, the method 490 continues with obtaining (block 504) the final value of the estimated surface pressure. The final value of the estimated surface pressure $P_2$ and the measured opening pressure of the sample bottle on the surface may then be compared. If the estimated and actual surface pressures of the sample bottle are close enough, for example within 15% of each other, then the sample bottle likely did not lose any fluid. Otherwise, leakage of the sample bottle may be suspected.

Figure 11:
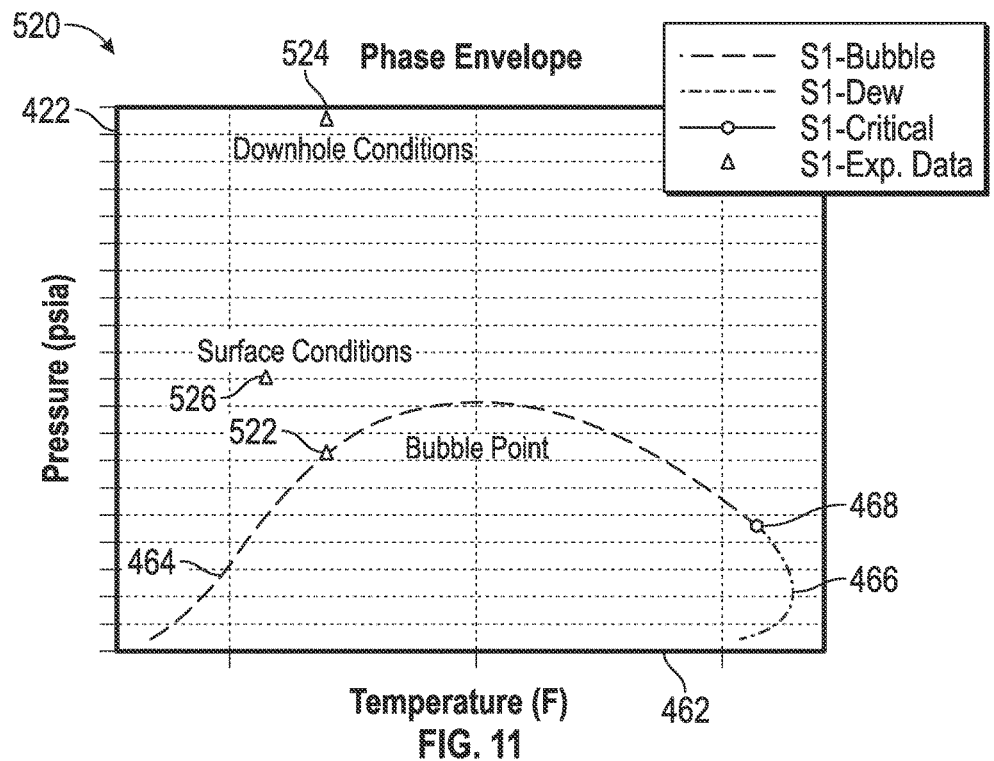
FIG. 11 is a plot depicting another embodiment of fluid analysis measurements obtained according to aspects of the present disclosure.
Figure 12:
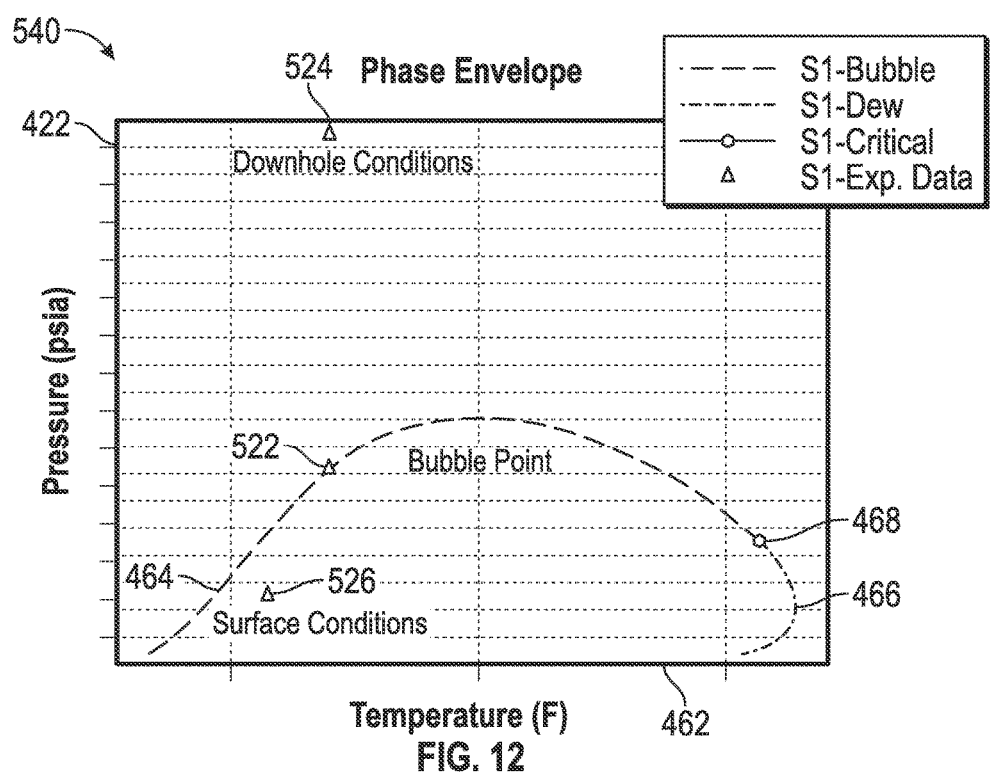
FIG. 12 is a plot also depicting another embodiment of fluid analysis measurements obtained according to aspects of the present disclosure.

In certain embodiments, the phase envelope (boundary) of the reservoir fluid can be generated using the EOS model after matching the saturation pressure at downhole conditions as shown in FIG. 11. As shown in FIG. 11, temperature 462 is shown on the x-axis, pressure 422 is shown on the y-axis, a bubble portion 464 of the phase envelope is shown on the left, a dew portion 466 of the phase envelope is shown on the right, the bubble and dew portions 464 and 466 are separated at point 468, the bubble point is represented by point 522, downhole conditions are represented by point 524, and surface conditions are represented by point 526. As shown in FIG. 11, if the surface pressure 526 is above the bubble point pressure 464, a single oil phase occurs. Otherwise, if the surface pressure 526 is below the bubble point pressure 464, as shown in FIG. 12, at least two vapor-liquid phases are split in the sample bottle. Furthermore, if some kinetic (irreversible) processes occur in the sample bottle, the sample is likely not representative. The original sample downhole may not be recovered even by using a sample restore process in the laboratory.

Figure 13:
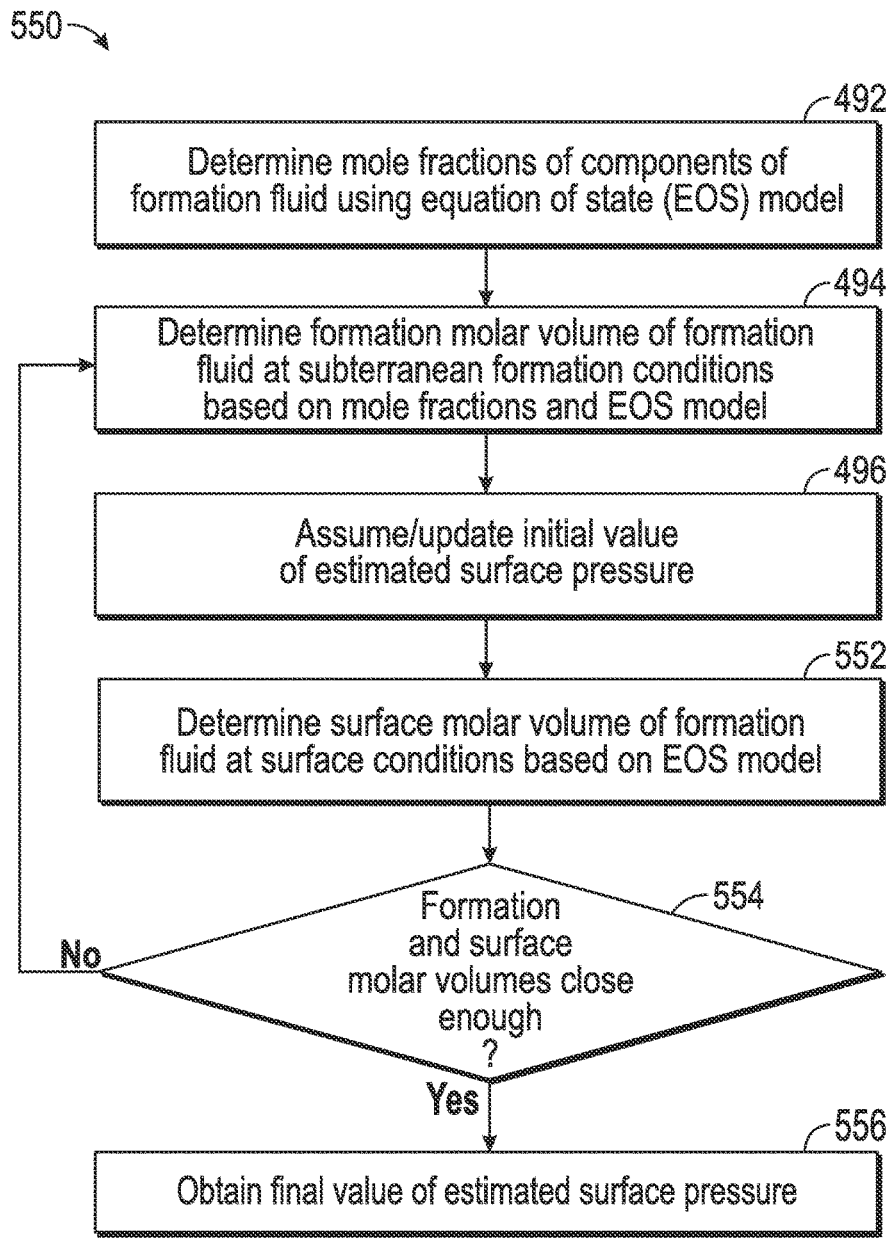
FIG. 13 is a flowchart depicting a method for determining an estimated surface pressure of a sample chamber using an equation of state (EOS) model, according to aspects of the present disclosure.

FIG. 13 depicts a method 550 for determining an estimated surface pressure of the sample chamber that also uses equations of state (EOS), but is somewhat simplified compared to the previous embodiment. Method 550 may be applied for oil in OBM where the water volume fraction is neglected.

To begin the method 550, the mole fractions of the components of the formation fluid may be determined (block 492) using an EOS model. For example, the delumping and characterization method described in U.S. Pat. No. 7,920,970, entitled "Methods and apparatus for characterization of petroleum fluid and applications thereof," filed Sep. 11, 2008, which is hereby incorporated herein by reference in its entirety, may be employed to convert the compositions in wt % to mole fractions ($z_i$) for all the components including pseudo-components. The EOS uses component properties, such as critical temperature, critical pressure, acentric factor, volume shift parameter, molecular weight, specific gravity, and boiling point temperature to generate binary interaction parameters. The EOS model is then established by tuning the EOS parameters to match DFA-measured GOR, density, and saturation pressure data. As a result of the tuning process, a more accurate EOS model is obtained.

Next, the formation molar volume of the formation fluid is determined (block 494) based on the mole fractions from block 492 and the EOS model. Specifically, one mole of reservoir fluid is assumed to begin the calculations. Next, the molar volume ($v_1$) of the reservoir fluid at the specified downhole sampling temperature and pressure ($P_1$, $T_1$) is determined using the tuned EOS model from block 492.

Next, an initial surface pressure ($P_2$) at a specified surface temperature ($T_2$) is assumed (block 496). Next, the molar volume ($v_2$) at the surface temperature and pressure ($P_2$, $T_2$) is determined (block 552) using the EOS model. Next, the molar volume ($v_2$) at the surface temperature and pressure ($P_2$, $T_2$) is compared (block 554) with the molar volume ($v_1$) of the reservoir fluid at the specified downhole sampling temperature and pressure ($P_1$, $T_1$) to determine if the two molar volumes are close enough. For example, if the absolute value of the difference between $v_2$ and $v_1$ is greater than a threshold value (e.g., if $|v_2-v_1|>10^{-12}$), then the value of $P_2$ is updated (block 496), and the method returns to block 552. Otherwise, if the values of $v_2$ and $v_1$ are close enough, the method 550 continues with obtaining (block 556) the final value of the estimated surface pressure. The final value of the estimated surface pressure $P_2$ and the measured opening pressure of the sample bottle on the surface may then be compared. If the estimated and actual surface pressures of the sample bottle are close enough, for example within 15% of each other, then the sample bottle likely did not lose any fluid. Otherwise, leakage of the sample bottle may be suspected. In certain embodiments, the phase envelope (boundary) of the reservoir fluid can be generated using the EOS model after matching the saturation pressure at downhole conditions as shown in FIGS. 11 and 12.

Although several methods for determining the estimated surface pressure are discussed separately above, in certain embodiments, one or more elements of the methods may be combined to develop additional embodiments. In addition, one or more of the elements of the methods may be performed in a different order from that discussed above. Further, in certain embodiments, two or more methods may be used and the results compared with one another to further verify the integrity of the sample chamber or to validate the results of a particular methods. Further various elements of the methods may be performed downhole, at the surface, or any combination thereof.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method, comprising:
    collecting formation fluid from a subterranean formation within a sample chamber disposed in a downhole tool;
    withdrawing the downhole tool from a wellbore;
    determining an estimated surface pressure of the collected formation fluid;
    comparing the estimated surface pressure of the collected formation fluid with an actual surface pressure of the sample chamber;
    determining an integrity of the sample chamber based on the comparison of the estimated surface pressure and the actual surface pressure; and
    improving accuracy of analysis by the downhole tool on the subterranean formation based on the determined integrity of the sample chamber;
    wherein determining an estimated surface pressure comprises:
        determining fluid fractions present in the sample chamber;
        determining a change in volume of water, if present in the formation fluid, from subterranean formation conditions to surface conditions; and
        determining the estimated surface pressure based on the fluid fractions and change in volume of water, if present.

2. The method of claim 1, comprising determining a thermal expansion coefficient of the collected formation fluid.

3. The method of claim 1, comprising:
    generating a phase envelope of the formation fluid using an equation of state model;
    determining a bubble point of the formation fluid at surface conditions based on the generated phase envelope; and
    determining the number of phases present in the sample chamber based on comparing the bubble point with the estimated surface pressure.

4. A method, comprising:
    collecting formation fluid from a subterranean formation within a sample chamber disposed in a downhole tool;
    withdrawing the downhole tool from a wellbore:
    determining an estimated surface pressure of the collected formation fluid;
    comparing the estimated surface pressure of the collected formation fluid with an actual surface pressure of the sample chamber;
    determining an integrity of the sample chamber based on the comparison of the estimated surface pressure and the actual surface pressure; and improving accuracy of analysis by the downhole tool on the subterranean formation based on the determined integrity of the sample chamber;

wherein determining an estimated surface pressure comprises:
  determining mole fractions of components of the formation fluid using an equation of state model;
  determining a formation molar volume of the formation fluid at subterranean formation conditions based on the mole fractions and the equation of state model;
  assuming an initial value of the estimated surface pressure;
  determining a first surface molar volume of the formation fluid at surface conditions based on a ratio of a formation fluid volume at surface conditions to a formation fluid volume at downhole conditions;
  determining a second surface molar volume of the formation fluid at surface conditions based on the equation of state model; and
  comparing the first and second surface molar volumes and updating the initial value of the estimated surface pressure based on the comparison to obtain the estimated surface pressure.

5. A method, comprising:
  collecting formation fluid from a subterranean formation within a sample chamber disposed in a downhole tool;
  withdrawing the downhole tool from a wellbore;
  determining an estimated surface pressure of the collected formation fluid;
  comparing the estimated surface pressure of the collected formation fluid with an actual surface pressure of the sample chamber;
  improving accuracy of analysis by the downhole tool on the subterranean formation based on the determined integrity of the sample chamber; and
  using the determined integrity of the sample chamber to improve accuracy of analysis by the downhole tool on the subterranean formation;
wherein determining an estimated surface pressure comprises:
  determining mole fractions of components of the formation fluid using an equation of state model;
  determining a formation molar volume of the formation fluid at subterranean formation conditions based on the mole fractions and the equation of state model;
  assuming an initial value of the estimated surface pressure;
  determining a surface molar volume of the formation fluid at surface conditions based on the equation of state model; and
  comparing the formation molar volume and the surface molar volume and updating the initial value of the estimated surface pressure based on the comparison to obtain the estimated surface pressure.

6. A method, comprising:
  determining an estimated surface pressure of a collected formation fluid stored in a sample chamber;
  comparing the estimated surface pressure of the collected formation fluid with an actual surface pressure of the sample chamber;
  determining an integrity of the sample chamber based on the comparison of the estimated surface pressure and the actual surface pressure; and
  using the determined integrity of the sample chamber to improve accuracy of analysis by the downhole tool on the subterranean formation;

wherein determining an estimated surface pressure comprises:
  determining fluid fractions present in the sample chamber;
  determining a change in volume of water, if present in the formation fluid, from subterranean formation conditions to surface conditions; and
  improving accuracy of analysis by the downhole tool on the subterranean formation based on the determined integrity of the sample chamber.

7. The method of claim 6, comprising determining a thermal expansion coefficient of the collected formation fluid.

8. The method of claim 6, comprising collecting formation fluid from a subterranean formation within the sample chamber disposed in a downhole tool.

9. The method of claim 6, comprising:
  generating a phase envelope of the formation fluid using an equation of state model;
  determining a bubble point of the formation fluid at surface conditions based on the generated phase envelope; and
  determining the number of phases present in the sample chamber based on comparing the bubble point with the estimated surface pressure.

10. A method, comprising:
  determining an estimated surface pressure of a collected formation fluid stored in a sample chamber;
  comparing the estimated surface pressure of the collected formation fluid with an actual surface pressure of the sample chamber;
  determining an integrity of the sample chamber based on the comparison of the estimated surface pressure and the actual surface pressure; and
  improving accuracy of analysis by the downhole tool on the subterranean formation based on the determined integrity of the sample chamber;
wherein determining an estimated surface pressure comprises:
  determining mole fractions of components of the formation fluid using an equation of state model;
  determining a formation molar volume of the formation fluid at subterranean formation conditions based on the mole fractions and the equation of state model;
  assuming an initial value of the estimated surface pressure;
  determining a first surface molar volume of the formation fluid at surface conditions based on a ratio of a formation fluid volume at surface conditions to a formation fluid volume at downhole conditions;
  determining a second surface molar volume of the formation fluid at surface conditions based on the equation of state model; and
  comparing the first and second surface molar volumes and updating the initial value of the estimated surface pressure based on the comparison to obtain the estimated surface pressure.

11. A method, comprising:
  determining an estimated surface pressure of a collected formation fluid stored in a sample chamber;
  comparing the estimated surface pressure of the collected formation fluid with an actual surface pressure of the sample chamber;
  determining an integrity of the sample chamber based on the comparison of the estimated surface pressure and the actual surface pressure; and improving accuracy of analysis by the downhole tool on the subterranean formation based on the determined integrity of the sample chamber;

wherein determining an estimated surface pressure comprises:

determining mole fractions of components of the formation fluid using an equation of state model;

determining a formation molar volume of the formation fluid at subterranean formation conditions based on the mole fractions and the equation of state model;

assuming an initial value of the estimated surface pressure;

determining a surface molar volume of the formation fluid at surface conditions based on the equation of state model; and comparing the formation molar volume and the surface molar volume and updating the initial value of the estimated surface pressure based on the comparison to obtain the estimated surface pressure.

* * * * *